SPREADER VEHICLE WITH POWER TAKE-OFF
Filed June 9, 1969 2 Sheets-Sheet 1
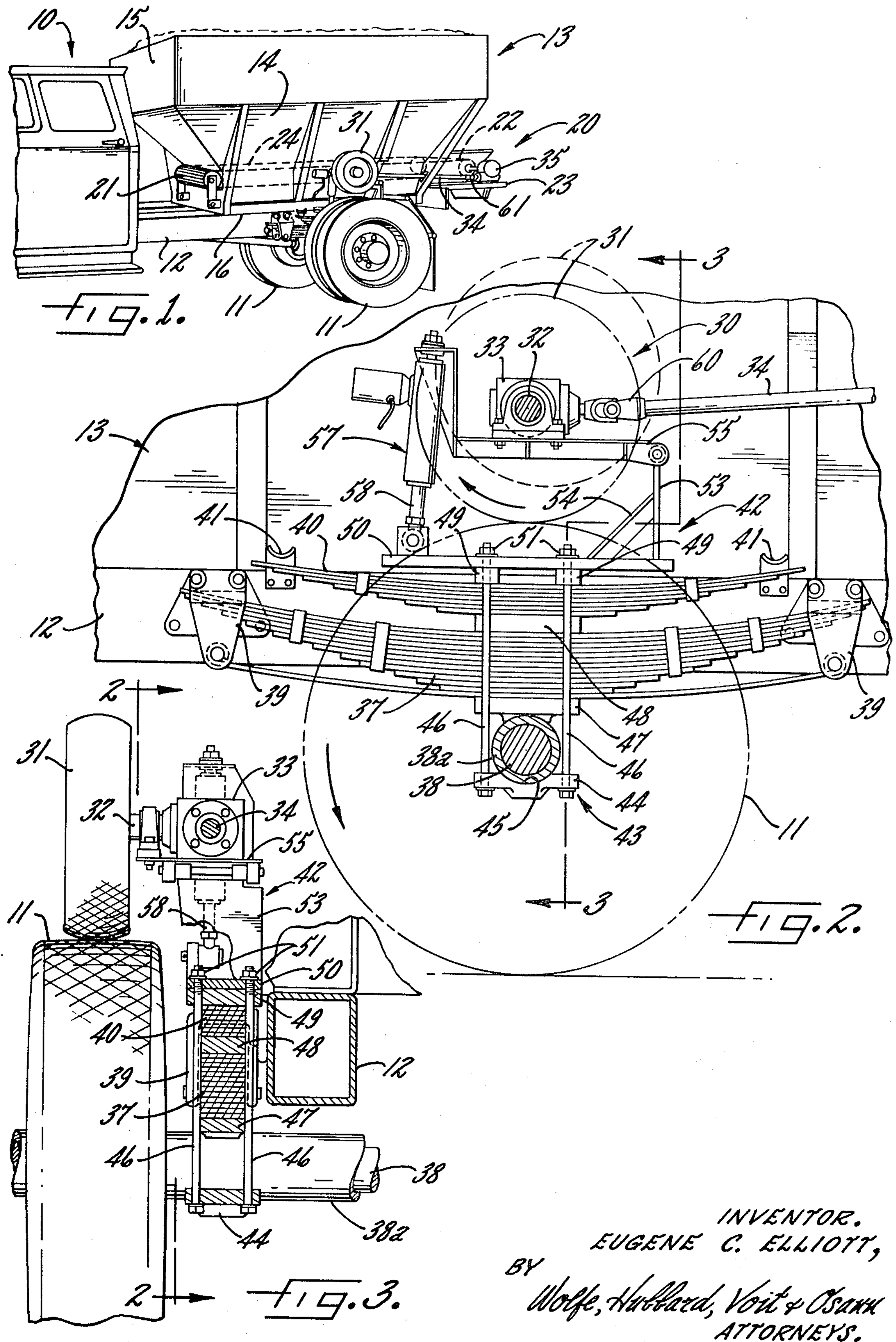
INVENTOR.
EUGENE C. ELLIOTT,
BY
Wolfe, Hubbard, Voit & Osann
ATTORNEYS.

SPREADER VEHICLE WITH POWER TAKE-OFF
Filed June 9, 1969
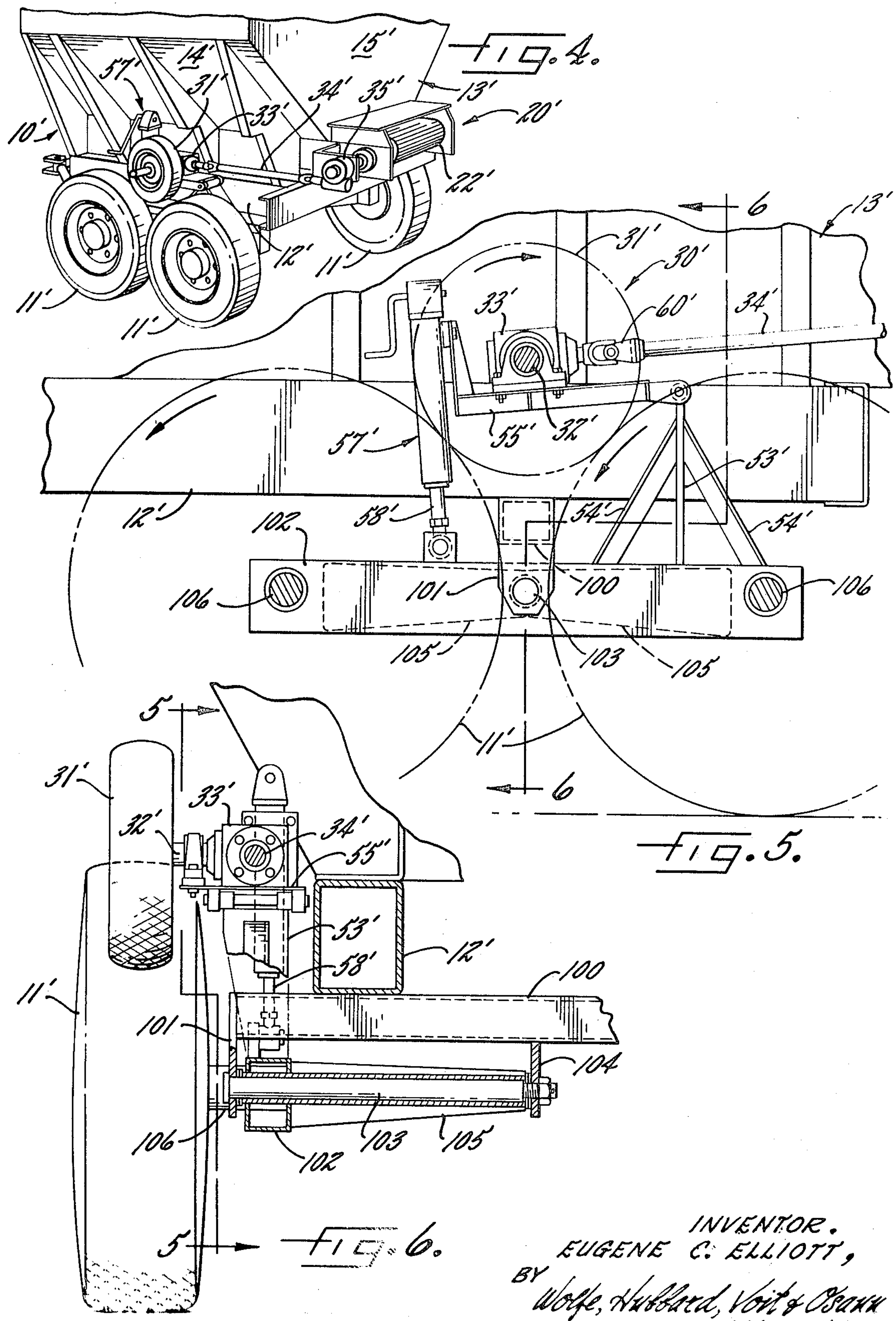

United States Patent Office 3,516,576
Patented June 23, 1970

3,516,576

SPREADER VEHICLE WITH POWER TAKE-OFF

Eugene C. Elliott, % E. C. Spreader,
Sharon, Wis. 53585

Filed June 9, 1969, Ser. No. 831,567
Int. Cl. A01c *15/00;* F16h *37/00*
U.S. Cl. 222—177 10 Claims

ABSTRACT OF THE DISCLOSURE

A vehicle for spreading fertilizer or the like in even quantities per area of ground covered by the vehicle even though the speed of the vehicle varies. The rear ground wheels of the vehicle are connected to the frame of the vehicle to float relative to the frame. A dispenser for dispensing the material is mounted on the vehicle and is driven directly and in timed relation to the speed of the vehicle by a power take-off unit driven by the rear ground wheels and mounted to float with the rear ground wheels. Two embodiments are illustrated and, in the first, the rear ground wheels are mounted on an axle which is connected to float relative to the vehicle frame by means of leaf springs. The power take-off comprises a drive wheel pressed into a tight frictional engagement with one rear ground wheel, and the drive wheel is mounted on the axle to float with the ground wheel and relative to the frame. In the other illustrated embodiment, a pair of rear ground wheels are mounted on each side of the vehicle and are supported on stub axles at oppostie ends of rocker arms pivotally connected to the frame to rock and thus floatably mount the rear ground wheels with respect to the frame. The power take-off, in this instance, comprises a drive wheel which is connected to the rocker arm to float with the ground wheels and which is pressed into tight frictional engagement with both of the rear ground wheels on one side of the vehicle.

BACKGROUND OF THE INVENTION

This invention relates to a wheeled vehicle for spreading a material such as fertilizer as the vehicle is pulled or driven at varying speeds across an area to be covered with the material. A dispenser dispenses the material at a rate generally proportional to the speed of the vehicle and is connected to and driven in timed relation with the speed of the vehicle by a power take-off from a ground wheel which is rotatably mounted on the vehicle to float relative to the frame of the vehicle.

SUMMARY OF THE INVENTION

The primary object of the present invention is to mount the power take-off with respect to the ground wheels such that the power take-off not only effects a more positive drive between the ground wheel and the dispenser but also more accurately reflects the speed of the vehicle than has been possible with prior devices of the same general character.

A related object is to mount the power take-off on the vehicle to float with the ground wheel and relative to the body of the vehicle thereby to maintain a positive drive between the power take-off and the ground wheel as the latter moves over rough terrain.

Another more detailed object is to provide a power take-off having a drive wheel mounted to rotate about an axis parallel to the rotational axis of one of the ground wheels in such a manner that the drive wheel can be locked into tread-to-tread slip-free engagement with the ground wheel regardless of the position of the ground wheel.

The invention also resides in the novel manner of supporting the drive wheel for slip-free engagement with ground wheels mounted for vertical floating in various different ways.

Other objects and advantages of the invention will become apparent from the following detailed description taken in connection with the accompanying drawings.

BRIEF DESCRIPTION OF THE DRAWINGS

FIG. 1 is a fragmentary perspective view of one embodiment of a new and improved vehicle incorporating the novel features of the present invention.

FIG. 2 is an enlarged fragmentary cross section of a portion of the vehicle shown in FIG. 1 and taken substantially along the line 2—2 of FIG. 3.

FIG. 3 is a fragmentary cross section taken substantially along the line 3—3 of FIG. 2.

FIG. 4 is a fragmentary perspective view of a second embodiment of a vehicle incorporating the features of the invention.

FIG. 5 is an enlarged fragmentary cross section of a portion of the vehicle shown in FIG. 4 and taken substantially along the line 5—5 of FIG. 6.

FIG. 6 is a fragmentary cross section taken substantially along the line 6—6 of FIG. 5.

DESCRIPTION OF THE PREFERRED EMBODIMENT

As shown in the drawings for purposes of illustration, the invention is embodied in a wheeled vehicle such as a truck 10 (FIG. 1) for spreading fertilizer or like materials at a generally uniform rate as the vehicle moves across the land to be treated and comprising ground wheels 11 floatably attached to a frame 12 with a hopper 13 mounted on the frame. The hopper is formed by side walls 14, end walls 15 and a bottom 16, and the lower half of the side and end walls slope inwardlly so that the area of the bottom is much smaller than the area of the top. Fertilizer is placed into the hopper through the top and is discharged from the hopper by a dispenser 20 mounted on the hopper. As best shown in FIG. 1, the dispenser, in this instance, is an endless belt conveyor 20 mounted along the inside bottom portion of the hopper and extending through an opening (not shown) in the rear wall of the hopper. The conveyor is formed by a pair of spaced apart rollers 21 and 22 with the roller 21 rotatably mounted on the hopper beyond the front end wall and with the roller 22 journaled in a support 23 connected to and extending beyond the rear end wall of the hopper. An endless belt 24 is trained around and tensioned between the rollers, and the rear roller 22 is driven to rotate clockwise (FIG. 1) thus moving the upper portion of the belt toward the rear to carry fertilizer rearwardly out of the hopper to be dropped onto a spinner (not shown) and to be spread over the ground.

To drive the conveyor 20, a power take-off 30 (FIG. 2) driven from one of the ground wheels 11 is connected to and rotates the rear roller 22. The power take-off comprises a drive wheel 31 pressed into tread-to-tread frictional engagement with one of the ground wheels so as to be rotated by that wheel. A stub axle 32 mounts the drive wheel for rotation and is journaled in a gear box 33. Through the gear box, the rotary motion of the drive wheel is transferred to a drive shaft 34 which drives a gear box 35 (FIG. 1) connected to the rear roller 22 to rotate the rear roller and move the belt 24.

In accordance with the present invention, the drive wheel 31 is mounted to float with one of the ground wheels 11 and relative to the frame 12 of the vehicle. With this arrangement, the drive wheel can be maintained in constant and substantially slip-free engagement with the ground wheel regardless of the roughness of the terrain over which the truck 10 passes this resulting in the speed of rotation of the drive wheel more accurately reflecting the speed of the vehicle than has been possible heretofore and, in this way, the dispenser 20 can be driven to dispense the fertilizer at a rate more accurately commensurate with the speed of the vehicle to more accurately dispense the fertilizer in even quantities per unit of land covered. Moreover, with the drive wheel maintained in more slip-free engagement with the ground wheel, more power is transmitted to the dispenser to enable the latter to discharge a greater volume of heavy material.

In the embodiment of the invention shown in FIGS. 1 to 3, the rear ground wheels 11 are floatably attached to the frame 12 by curved leaf springs 37 (FIG. 2). The rear ground wheels are mounted on a single rigid axle 38 which extends through a housing 38*a* across the rear portion of the truck beneath the frame, and two ground wheels are fastened side-by-side on each end portion of the axle for rotation about the axis of the axle. Extending longitudinally along each side of the frame are the leaf springs which connect the axle to the frame so that the axle and the ground wheels float relative to the frame and the hopper 13 of the truck. The center of the leaf springs rides on top of the axle, and the ends of the springs are slidable within holders 39 (FIG. 2) which are rigidly mounted on and extend outwardly from the frame. As the hopper 13 is loaded, the springs bend toward a straight position and the ends of the springs slide in the holders thus lowering the hopper and moving the latter closer to the axle. Leaf-type overload springs 40 are mounted above the leaf-springs and, when the load on the body becomes too great, the ends of the overload springs engage holders 41 on the frame to help the leaf springs support the weight.

Advantageously, the leaf springs 37, the overload springs 40 and a support 42 for the drive wheel 31 are all mounted on the axle housing 38*a* by a single U-shaped connector 43 (FIG. 2). Herein, the U-shaped connector is formed by a generally rectangular plate 44 with a cylindrical depression 45 formed in the top surface and positioned transversely of the axle housing to engage the bottom portion of the housing, and by four bolts 46 which extend upwardly through the corner portions of the plate on either side of the housing. A generally rectangular clamp 47 with a cylindrical depression in the bottom and flat on the top is positioned across the top portion of the axle housing between the housing and the leaf springs to seat the leaf springs on the housing and is held in position by the bolts which extend through the corner portions of the spacer with two bolts on each side of the springs. Seated on the upper surface of the leaf springs is a flat rectangular spacer 48 which spaces the overload springs from the leaf springs, and the bolts extend through the corner portions of this spacer. Above the overload springs, a pair of narrow rectangular spacer blocks 49 are positioned parallel with the axle housing, and the two bolts on one side of the housing extend through one block and the two bolts on the other side extend through the other block. A rectangular support plate 50 forming part of the support 42 extends longitudinally of the body of the vehicle and is seated horizontally on the upper surfaces of the blocks with the bolts extending through the support plate. The upper ends of the bolts are threaded, and nuts 51 are screwed down on the bolts to clamp the support plate rigidly to the axle housing through the various springs and spacers. It should be realized that there is no vertical give in the springs at their central areas so that the support plate can be rigidly mounted to the axle housing through the springs and will not float relative to the housing.

With the above arrangement, the drive wheel 31 can be mounted on the support plate 50 to float with the axle 38 and the ground wheels 11 and relative to the frame 12. Further, the drive wheel is mounted on the support plate in a manner which allows the drive wheel to be pressed into tread-to-tread tight frictional engagement with one of the ground wheels. To these ends, a support member 53 (FIG. 2) is welded to and extends vertically from the support plate near one end of the support plate, and an angle 54 extends diagonally between the support plate and the support member to brace the support member. Pivotally attached at one end to the upper end of the support member and extending generally horizontally over the support plate is a mounting plate 55 for the drive wheel 31. The gear box 33 is supported on the mounting plate, and the stub axle 32 with one end portion journaled in the gear box positions the drive wheel directly above one ground wheel 11.

The mounting plate 55 is pivotally attached to the support member 53 so that the plate can be swung to lower and raise the plate and move the drive wheel 31 toward or away from the ground wheel 11. To move the drive wheel in this manner and to lock the latter down against the ground wheel, an actuator 57, in this instance an electric jack which can be controlled from the cab of the truck 10, is connected between the other end of the mounting plate 55 and the support plate 50 with the head end of the jack being rigidly connected to the mounting plate and the rod end of the jack being pivotally connected to the support plate. By extending or retracting the rod 58 of the jack, the mounting plate can be swung away from or toward the axle 38. When the jack is activated to retract the rod, the mounting plate swings toward the axle thus forcing the drive wheel into tread-to-tread engagement with the ground wheel. In this manner, the drive wheel can be forced into and held with such a tight friction fit against the ground wheel that the drive wheel will not slip when used as a power take-off. With the drive wheel supported on the rigid axle to float with the ground wheel, the drive wheel moves up and down with the ground wheel as the latter rolls along the ground and bounces thus insuring that the drive wheel will remain locked against the ground wheel and, as a result, be driven in direct relation with the speed of the ground wheel.

The drive wheel 31 is used to drive the conveyor 20 and to drive the latter in direct relation to the speed of the truck 10 so that, the faster the truck travels, the more fertilizer is spread thus keeping the amount of fertilizer per distance covered the same. Because the drive wheel and gear box 33 are mounted to float relative to the hopper 13 and because the rear roller 22 of the conveyor is mounted on the hopper, a pair of universal joints 60 (FIG. 2) and 61 (FIG. 1) are placed at the ends of the drive shaft 34 to connect the drive shaft to the gear boxes 33 and 35, respectively. With the universal joints in the drive train, the gear box 35 on the rear roller is free to move vertically relative to the gear box 33 while the drive shaft rotates to transmit power.

A modified vehicle, herein a trailer 10', embodying the novel features of the invention is shown in FIGS. 4 through 6 in which parts corresponding to those of the first embodiment are indicated by the same but primed reference numerals. Like the truck 10 of the first embodiment, the trailer 10' includes a hopper 13' with side walls 14' and end walls 15', ground wheels 11', a conveyor 20' with a driven rear roller 22' and, to operate the conveyor, a power take-off unit 30' which includes a drive wheel 31' acting through the gear boxes 33' and 35' at opposite ends of a drive shaft 34'. In the embodiment shown in FIGS. 4 through 6, the drive wheel 31' is mounted, as in the embodiment of FIGS. 1 through 3, to float with the ground wheels 11' and relative to the frame 12' of the trailer 10', and the ground wheels 11' are attached floatably to the frame by a bogie-type mounting.

With the bogie-type mounting, there are two ground wheels 11' on each side of the trailer 10' with the wheels on each side being spaced along the trailer rather than side-by-side, and the wheels on each side are mounted on either side of a horizontal laterally extending axis to rock about that axis and float relative to the frame

12'. In this instance, the bogie mounting comprises an upper support member 100 (FIG. 6) which extends laterally across the frame 12' of the trailer, and the frame 12' rests on the upper support member. At each end of the upper support member (only one end shown), a plate 101 (FIGS. 5 and 6) is welded to and depends from the member. A wheel supporting rocker arm or bogie arm 102 is pivotally connected at the center of the latter to the plate by a pivot pin 103 to rock about the pivot pin. For stability and support, the pivot pin extends transversely of the frame 12' through the support plate 101, through the bogie arm and through a second support plate 104 (FIG. 6) rigid with and depending from the upper support member and spaced inwardly of the end of the upper support member. To supply additional support, two braces 105 (FIG. 5) rigid with the inside face of the bogie arm on opposite sides of the pivot pin extend inwardly and are welded to the second plate. The ground wheels 11' are pivotally mounted on the opposite end portions of each bogie arm by stub axles 106. With this arrangement, the ground wheels are mounted to float vertically relative to the frame 12' of the trailer 10' because the ground wheels on each side of the trailer rock with the respective bogie arm about the respective pivot pin as these wheels pass over rough terrain, raising the wheel at one end of the bogie arm and lowering the wheel at the other end.

So that the drive wheel 31' can float with the ground wheels 11', the drive wheel is mounted on one bogie arm 102. The drive wheel is centered between the two ground wheels and locked into tight tread-to-tread frictional engagement with both ground wheels so that, as the ground wheels rock with the bogie arm, the drive wheel will rock with the ground wheels and thus remain locked rigidly against both ground wheels. To mount the drive wheel on the bogie arm, a support member 53' braced by two diagonally extending angles 54' is rigid with and extends upwardly from the bogie arm near one end of the bogie arm. A mounting plate 55' is pivotally attached at one end of the upper end of the support member, and the mounting plate extends generally horizontally over the bogie arm with the drive wheel journaled by a stub axle 32' in the gear box 33' fixed to the upper surface of the mounting plate at a point over the pivot pin 103.

The mounting plate 55' is pivotally attached to the support member 53' so that the plate can be swung to lower and raise the plate and move the drive wheel 31' toward or away from the ground wheels 11'. To move the drive wheel in this manner and to lock the latter down against the ground wheels, a jack 57', in this instance a manually operated jack, is connected between the mounting plate and the bogie arm 102 on the opposite side of the pivot pin 103 from the connection of the support member 53' to the bogie arm. The head end of the jack is rigidly connected to the mounting plate and the rod end of the jack is pivotally connected to the bogie arm. By retracting the rod 58' of the jack, the mounting plate can be swung downwardly toward the bogie arm thus moving the drive wheel into tread-to-tread engagement with both ground wheels between the latter. In this manner, the drive wheel can be forced into such a tight frictional fit with the ground wheels that the drive wheel will not slip when used as a power take-off. With the drive wheel positioned over the pivot pin 103 and supported on the bogie arm 102 on each side of the pivot pin, the stub axle of the drive wheel can be locked in position by the jack a given distance from the stub axle 106 of each ground wheel. The axles will remain this given distance apart regardless of how much the bogie arm should rock as the trailer is pulled across rough terrain because the drive wheel rocks with the ground wheels resulting in the drive wheel floating with the ground wheels and relative to the frame 12' of the trailer 10'. This arrangement insures that the drive wheel will always be driven at a speed directly related to the speed of the ground wheels.

It will be observed from the above that mounting the drive wheels 31, 31' to float with the ground wheels 11, 11' and relative to the frame 12, 12' of the vehicle 10, 10' is a particularly advantageous arrangement. With this arrangement, the drive wheel can be maintained in constant tread-to-tread contact with one ground wheel resulting in the drive wheel being driven at a speed which is in direct relation to the speed of the vehicle. With this arrangement the drive wheel provides a substantially slip-free power take-off not only to enable positive and direct driving of the dispenser 20, 20' under heavy loads but also to insure that the dispenser is driven in precise timed relation with the speed of the vehicle so that the fertilizer is spread evenly over the ground regardless of the varying speed of the vehicle or the roughness of the terrain being covered.

I claim as my invention:

1. A vehicle adapted to dispense material in uniform quantities per distance covered and having a frame, ground wheels, means attaching said ground wheels to said frame for vertical floating, and a dispenser carried on said frame for dispensing the material as the vehicle moves over terrain, the improvement comprising, a power take-off unit mounted to float with said ground wheels and relative to said frame, said unit comprising a support mounted to float as a unit with said ground wheels and relative to said frame, a drive wheel rotatably mounted on said support and positioned in tread-to-tread relation with one of said ground wheels, means on said support for locking said drive wheel into a tight friction fit against the tread of said one ground wheel to float as a unit with said wheel so that said drive wheel is driven in timed relation with the rotation of the ground wheel, and power transmitting means connecting said drive wheel to said dispenser to drive said dispenser in precise timed relation with the speed of the vehicle whereby the material is spread at a rate reflecting the speed of the ground wheels regardless of the roughness of the terrain over which the vehicle passes.

2. The vehicle of claim 1 in which said one ground wheel and said drive wheel are mounted to rotate about parallel axes and, when said drive wheel is locked into said tight friction fit against said one ground wheel, the distance between said axes is fixed and does not vary as the ground wheel floats relative to said frame.

3. The vehicle of claim 1 further including a housing, a rigid axle extending transversely of the vehicle and journaled in said housing, said ground wheels being connected to opposite ends of said axle to rotate about the axis thereof, said attaching means being springs connecting said housing to said frame and mounting said ground wheels to float relative to said frame, and said support being rigidly mounted on said housing.

4. The vehicle of claim 1 further including a rocker arm extending longitudinally along one side of the vehicle and pivotally connected intermediate its ends to the frame, one stub axle on each end portion of said arm, a ground wheel rotatably mounted on each said axle to pivot with said rocker arm and float relative to said frame, said support being mounted on said rocker arm to float with the latter, and said drive wheel being mounted in tread-to-tread relation with said ground wheels on said axles and locked into a tight friction fit against both such ground wheels by said locking means so that, as the rocker arm swings to enable floating of said ground wheels with respect to said frame, said drive wheel is maintained in a tight friction fit against said ground wheels and floats with the ground wheels.

5. A vehicle adapted to dispense material in uniform quantities per distance covered and having a frame, an axle housing, an axle extending transversely of said frame and journaled in said housing, a ground wheel mounted on one end of said axle to rotate about the axis thereof, springs disposed between said housing and said frame to mount said ground wheel and said axle on said frame for vertical floating relative to said frame, and a dispenser carried by said frame and operable to dispense the material, the improvement comprising, a support rigidly mounted on said housing near said one end of said housing, a drive wheel mounted on said support to rotate about an axis and positioned in tread-to-tread relation with said ground wheel, means for locking said drive wheel into a tight friction fit against said ground wheel to float as a unit with said ground wheel so that, when said ground wheel rotates, said drive wheel is positively driven by said ground wheel, and power transmitting means connected between said drive wheel and said dispenser to mechanically drive said dispenser in timed relation with the rotation of the ground wheel whereby the material is dispensed at a rate directly proportional to the speed of the ground wheel.

6. The vehicle of claim 5 in which said locking means is mounted on said support to float with said ground wheel.

7. In a vehicle adapted to dispense material in uniform quantities per distance covered and having a frame, a dispenser carried on said frame and operable to dispense the material, a rocker arm pivotally attached intermediate its ends to the frame to rock about an axis extending transversely of the frame, axles on the ends of said arm, and ground wheels rotatably mounted on said axles to rock with said arm and float relative to said frame, the improvement comprising, a drive wheel mounted on said rocker arm to rotate about an axis and positioned between and in tread-to-tread engagement with said ground wheels, means for locking said drive wheel into a tight friction fit against said ground wheel to float with said wheels and relative to said frame so that, as said ground wheels rotate, said drive wheel is positively driven by the ground wheels, and power transmitting means connected between said drive wheel and said dispenser to drive said dispenser in timed relation with the rotation of the ground wheel whereby the material is dispensed at a rate directly proportional to the speed of the ground wheels.

8. The vehicle of claim 7 in which said locking means is connected between said drive wheel and said rocker arm to float with said ground wheels.

9. The device of claim 7 further including a support mounted on and upstanding from one end portion of said rocker arm, a support arm pivotally connected at one end to the upper end of said support, said drive wheel being journaled on said support arm, said locking means comprising an actuator connected between the rocker arm and the support arm and operable to swing the support arm toward the rocker arm to lock the drive wheel into a tight friction fit against the ground wheels.

10. The device of claim 7 in which the axis of rotation of said drive wheel is maintained a fixed distance from said axles as said rocker arm rocks.

References Cited

UNITED STATES PATENTS

| | | | |
|---|---|---|---|
| 2,904,224 | 9/1959 | Young | 222—177 |
| 3,334,760 | 8/1967 | Bolinger et al. | 222—177 |

ROBERT B. REEVES, Primary Examiner

H. S. LANE, Assistant Examiner

U.S. Cl. X.R.

74—13